United States Patent Office 3,565,582
Patented Feb. 23, 1971

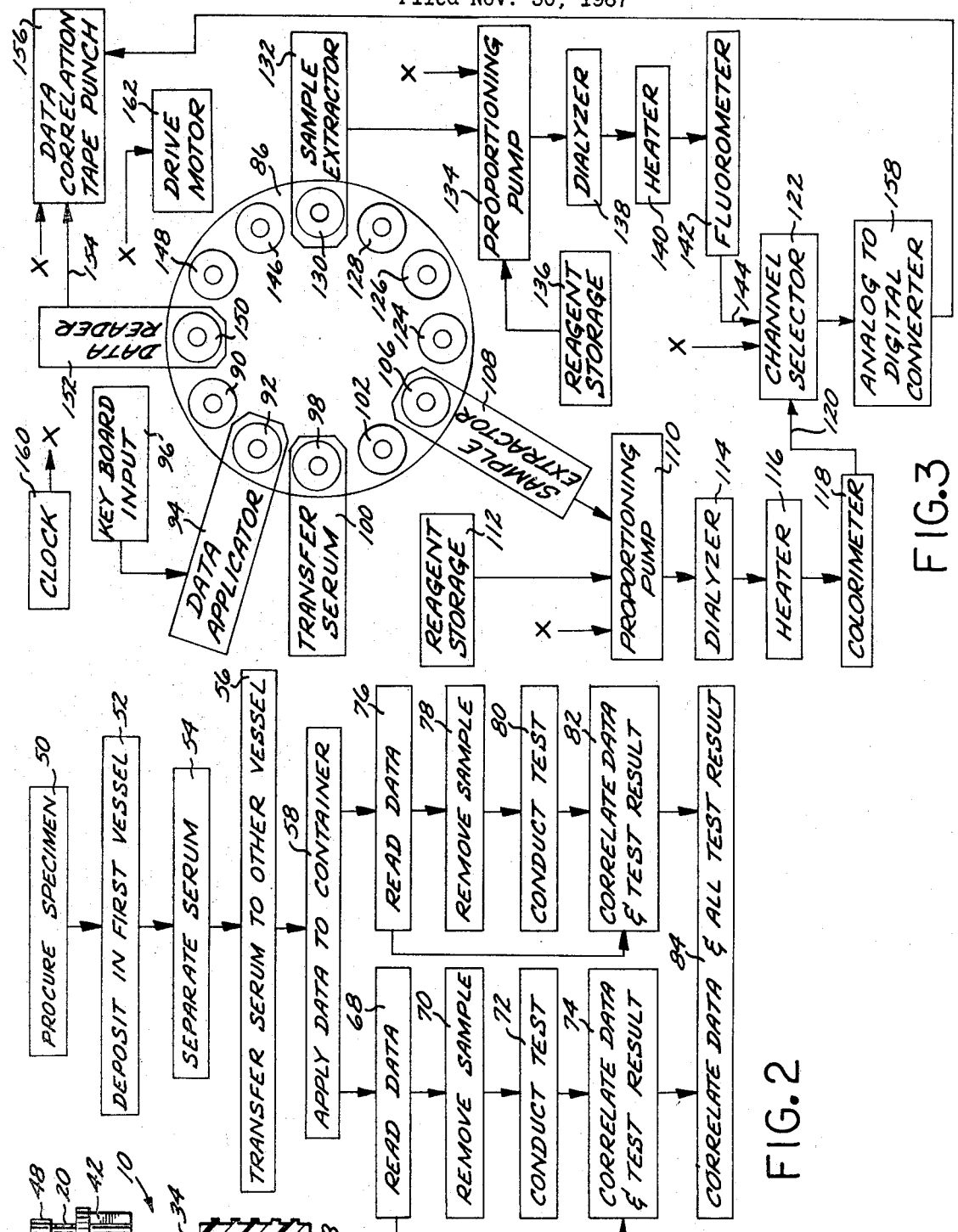
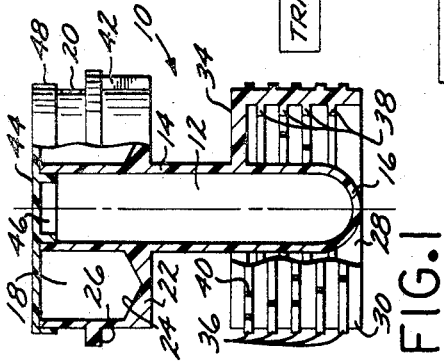

3,565,582
METHODS AND MEANS FOR HANDLING BLOOD TEST SPECIMENS
Robert R. Young, 2422 Level Ave.,
Anaheim, Calif. 92804
Filed Nov. 30, 1967, Ser. No. 686,983
Int. Cl. B01l *3/00;* G01n *33/16*
U.S. Cl. 23—230                                12 Claims

ABSTRACT OF THE DISCLOSURE

Method of handling blood specimens in a blood testing routine and apparatus by which the method may be practiced. In the method, blood placed in one vessel of a dual vessel container is centrifuged to separate serum from the remainder of the blood constituents. Identifying data in the form of physical information is applied to the container. Thereafter, serum is drawn from the vessel in which separation was conducted and is deposited in the other vessel. Subsequently, serum is withdrawn from that other vessel and is tested, the test information being recorded and correlated with the data applied to the container.

One form of container suitable for use in the invention is described together with a carrousel and pumping and testing units. These elements are coordinated such that data identifying the sample is correlated with successively conducted tests in a means for recording that information in composite form.

---

This invention relates to improvements in methods and means for handling blood test specimens. In particular it relates to improvements in the methods and means for controlling blood specimens before and during the conduct of diagnostic tests to insure proper correlation between test results and specimen identification data.

Medical practitioners have come to rely at an accelerated rate upon chemical analysis of blood samples as an aid in diagnosing illness, in determining the degree of illness, and in evaluation the degree in which a remedy may be required or is effective. Both the types of tests and the number of tests conducted on each specimen have greatly increased in recent years. In general, the diagnostic data to be developed by these tests relates to the presence and proportionate amount of various constituent materials in blood serum. For example, a physician may require information about the proportionate quantity in a blood specimen of phenylalanie, prenatal antibodies, glutamic-oxalecetic, transammase, bilirubin, uric acid, inorganic phosphate, creatinine and ureanitrogen, cholesterol, calcium or any of a hundred or more others. Often diagnosis depends upon the relative proportions of several substances so that a single specimen is usually subjected to a number of tests. Five or six tests are called "standard" and are usually routinely conducted for general information. Those tests that are conducted to verify the existence or nonexistence of specific difficulties are called "special."

It is estimated that the individual blood tests conducted each working day in biomedical and hospital laboratories in the United States are numbered in the hundreds of thousands. Many of the tests require a long time to complete if conducted chemically to completion and as a practical matter this demand for testing cannot be met by older, conventional test methods. To meet the demand automatic analyzing techniques have been developed which employ colorimetry, spectrophotometry, flamephotometry, fluorometry, and absorption spectrometry. These techniques developed the required information without need to let the chemical test reaction run its course. In general a reagent and a sample of the blood specimen are combined and the result heated or otherwise treated and then compared with standards in a colorimeter, fluorometer, or other appropriate instrument. This procedure has greatly reduced the test time and it has permitted some degree of automation. However, despite the fact that some tests are conducted so frequently as to be called "standard" most specimens are also subjected to "special" tests which require different re-agents and different processing. The result has been that complete automation is impractical and will continue to be impractical for the foreseeable future at least in all but the largest laboratories.

This means that many blood tests are now and will be conducted in the future on a batch basis in which each of a group of specimens is subjected in turn to one or several tests and when all have been subjected to those tests, then another test is begun and all specimens are subjected in turn to it.

It is absolutely essential that test results be correctly correlated with the specimen tested. Failure to correlate correctly can result in improper diagnosis and treatment of illness sometimes with fatal effect. Improper correlation is often very difficult to detect. Test results may differ one from the other only in small absolute degree but may have very great different meanings in an interpretation based on the relative results of several tests. Proper correlation may be insured either by means for detecting and correcting error or by means for preventing error. It is an object of this invention to provide a means for preventing error.

The opportunity for error in the batch processing procedure is very great and an object of the invention is to reduce that error potential or opportunity. A related object is to provide a method and means for handling blood specimens that will reduce the correlation errors that have heretofore attended batch testing. While the invention has application in the testing of materials other than blood, it is particularly suited to the testing of blood, and another object is to provide blood specimen handling methods and means which complement existing automatic blood testing apparatus and techniques.

In the present commercial method as it is almost always practiced, at least in the United States, a blood specimen is withdrawn from a patient using a syringe and it is transferred from the syringe to a clean test tube by piercing through a self-sealing membrane which covers the mouth of the tube and then discharging the syringe into the tube. Alternatively the vena puncture is performed using a double ended syringe needle only. After completing a successful vena puncture an evacuated test tube is applied to the exposed end of the syringe needle by inserting said end through the self-sealing stopper. The vacuum then draws off the specimen. Information identifying the patient and the test to be conducted is then associated with the tube. The practice differs in detail at this point but in every case the tube and some identifying data are transported together to the testing laboratory. Most tests are conducted on the serum of the blood so an initial step is to separate the serum from the remaining constituents of the specimen in a centrifuge. The specimen is centrifuged in its original test tube. The serum, being the lighter substance, is forced to the upper portion of the tube. From here some of the fluid is transferred to other test tubes or cups. The cups of serum are eventually placed in the holding stations of a carrousel which forms a part of most of the semi-automatic testing apparatus currently employed and is associated specifically with apparatus for drawing test samples from the specimen and subjecting the samples to a given first test. After samples have been withdrawn from all of the cups stationed in the carrousel, selected sample cups are removed from the carrousel and assembled with others in other carrousels to be asociated with apparatus for withdrawing samples and conducting other tests. Thus, large numbers of sample cups are assembled and re-assembled and combined and recombined in various ways to form the batches that are to be tested semi-automatically. Data which identifies the subject and the test to be conducted must be transferred from the initial test tube to the cup and thereafter either that data or the cup must be transferred from the initial test tube to the cup and thereafter either that data or the cup must be correlated with the data at each test. The problem is complicated by the fact that existing test apparatus is capable of and does test several samples simultaneously each in a successive one of a sequence of test steps.

Test laboratories have developed individual techniques by which to insure proper correlation between test results and identification data. In most instances, these techniques rely on physical placement of the data and the specimen in storage areas and in the carrousels, in series or in some predefined order so that correlation is a function of physical placement or order. The opportunity for error is very high and the incidents is reputed to be very high. Whatever its magnitude, the problem has received considerable attention from governmental officials, mal-practice insurers, the medical profession and from clinical chemists.

While the semi-automatic continuous techniques described above comprise the best comprise of speed, accuracy and cost currently available, they commit the industry to batch testing of blood samples. The problem is to reduce the potential for error within the practical limits imposed by those techniques. An object of the invention is to provide means and methods within those practical limits which will greatly reduce the chance for error. It is an object to enable provision of such error reduction potential at a minimum relative cost even in the absence of other advantage. However, the invention does provide other advantages and it is another object of the invention to provide them. The method and means of the invention, is preferred form, lend themselves to accumulation of data in a form which permits automatic analysis of comparative test results using minimlm processing equipment and in particular without need for "online" information storage or computing equipment.

These and other objects and advantages of the invention, which will be apparent upon examination of the drawings and of the following specification of an embodiment of the invention, are realized in part by the provision of a double vessel container for blood and its serum which is capable of bearing data identifying the blood and the test prescribed together with apparatus for reading that data and for conducting tests according to a predetermined relative time schedule. An especially advantageous form of double vessel container is embraced within the inventive concept. The method is advantageously practiced using that vessel. However, it can be practiced with any container which comprises two vessels which have a physical connection one to the other. The blood specimen is placed in one vessel of the two vessel container, and while in that vessel is centrifuged to separate the serum from the remaining blood constituents. Thereafter, some of the serum is transferred from the initial or first vessel to the other or second vessel. A sample of the specimen is withdrawn and is subjected to the test sequence which includes the testing and presentation of the test result. These steps, withdrawal of the sample, testing and presentation of test results are accomplished according to a predefined time schedule. An added step in the process, and one which may be accomplished at any point in the process thus far described, is to apply to the container indicia or data which will identify the specimen and the test to which it is to be subjected. Another step is also required. At some point in the series of steps which is conducted according to a predetermined time schedule the identification data on the container is read and that data is correlated with the result of tests upon the sample identified by that data. In a preferred form of the method, the data on the container is read prior to withdrawal of the test sample to avoid taking that sample unless the data on the container indicates that the test for which it is being taken is one of those to be conducted. However, it is not essential that the data be read prior to taking the sample or prior to conducting the test. In some cases, it may be advantageous simply to run the test and then reject data if the test is not required. Upon withdrawal of a test sample a specimen upon which other tests are to be run is placed in storage and is then submitted to another timed sequence of steps including sample withdrawal, testing and presentation of test results. The storage step may be included in the time sequence of steps. The step of reading the data on the container and correlating that data with the test results will also be included in the timed sequence of steps. This process is repeated if additional tests are to be conducted. Advantageously, the process includes collection of all of the test result information relating to a single specimen in a single report.

In the drawings:

FIG. 1 is a view in side elevation of a double vessel specimen container embodying the invention and which is advantageously employed in practicing the method of the invention;

FIG. 2 is a diagram of a sequence of steps which comprise the method of the invention;

FIG. 3 is a schematic drawing of a specimen container transfer mechanism including a serum transfer apparatus, a container data reading apparatus and a sample withdrawal and test apparatus.

Referring to FIG. 1 of the drawings, there is shown a container generally designated 10 which incorporates a means for retaining a sample of whole blood; means by which the whole blood so retained may be treated, as by centrifuging, to separate the blood serum from the remaining constituents of the blood without removal of the whole blood from the container; means by which selected portions of the serum may be retained separate from the remainder of the blood and its serum, means for determining visually whether separation of serum from the remainder of the blood has in fact occurred; and means for physically associating identification data with the container. Advantageously, the means for retaining the blood sample and the means for retaining selected portions of the blood serum taken from the blood sample comprise separate but physically interconnected vessels. In the preferred form of the invention, the means for associating identification data with the blood sample comprises a generally cylindrical surface of the container 10 to which surface identifying information may be applied. In the preferred form of the invention that vessel which contains whole blood is made transparent whereby to enable visual determination whether the blood serum has, in fact, been separated from the remainder of the blood. The receptacle 10 shown in FIG. 1 incorporates all of these features and has the currently preferred form. It comprises a body of rigid, transparent plastic material which is generally symmetrical about its central axis. It has an inner vessel 12, having generally cylindrical side walls 14 the bottom portions 16 of which is rounded and closed and the upper portion of which is open. The inner vessel 12 has an appearance similar to that of a test tube and advantageously, as shown, has a ratio of inside diameter to inside length of one-fifth or less.

The second vessel 18 of the container 10 is concentric with the first vessel 12 and is formed by a generally cylindrical wall 20 surrounding the wall 14 of vessel 12 at its upper end and by a bottom wall 22 which joins the wall 20 and the wall 14 of vessel 12 at a point which advantageously is above the mid-point along the length of the inner vessel 12. The side wall 20 of the vessel 18 extends to the same level as does the wall 14 of vessel 12 and the vessel 18 is open at its top or upper end. The bottom wall 22 of the second vessel is shaped at its interior side in a way that facilitates removal of fluid. In the embodiment shown, the bottom is V-shaped in cross-section to provide what is in effect an annular groove 24 into which the last drops of fluid will flow so that a greater proportion of the fluid may be removed. The exterior face of bottom wall 22 advantageously is formed so that it may be used as a drive surface for rotating the container 10 about its central axis. To this end, the container shown in FIG. 1 has the lower face of its wall 22 formed flat and in a plane normal to the central axis of the unit.

The means by which the container may be treated to insure separation of the blood serum from the remainder of the blood constituents, comprises a holding flange 26 extending about the periphery of the outer surface of the wall 20 of vessel 18 in a plane normal to the central axis of the receptacle 10. The receptacle may be held by this flange and may pivot about it during the centrifuging operation. Whole blood placed in the interior or first vessel 12 is separated into its constituents when the container is rotated in a swinging motion about an axis generally perpendicular to its own axis and is free to pivot on its flange so that the closed end of the inner vessel swings away from the rotational axis.

The flange 26, or other means used to hold the container during the centrifuging operation, is arranged so that it lies above the center of gravity of the container 10 whether the container is empty, or contains a blood sample in its inner vessel 12, or contains serum in the outer vessel 18 and the blood specimen in the inner vessel 12.

In the embodiment selected for illustration in FIG. 1, the means by which identification data may be applied to the vessel comprises a skirt 28 formed by a cylindrical side wall 30 concentric with and encompassing the lower end of the inner vessel 12 of the container 10. An upper, lateral wall 34 spans the space from the wall 14 of the inner vessel 12 to the side wall 30 of the data skirt 28. The inner vessel and the skirt wall 30 are not joined at the lower end of the skirt wall. The lower end of the skirt is open to afford access to the inside wall of the skirt. The lower edge of the wall 30 extends to or below the level of the lower end 16 of the vessel 12, whereby the container may be rested at this lower edge with its central axis positioned vertically so that the container is freestanding. In addition to making the vessel freestanding, the function of this skirt is to lower the center of gravity and to provide a surface on which data may be marked. In the preferred form the diameter of the skirt is approximately that of the wall 20 of the upper vessel 18 of the container, whereby to provide maximum resolution in the application and reading of identification data without increasing the horizontal area occupied by the container. The upper wall 34 of skirt 28 lies in a plane perpendicular to the central axis of the container at a point below the mid-point along the length of the inner container 12. Thus, upper wall 34 of the skirt and lower wall 22 of the outer container 18 are separated to afford a direct view of the lengthwise midsection of the inner container 12 to enable visual determination of whether separation of the blood sample has occurred. The proportion of blood serum varies from a minimum of fifty-three percent in males to a maximum of about sixty-three percent in females, so that skirt 28 advantageously covers no more than the lower thirty-five percent of the inner vessel 12.

Any of a number of entirely suitable arrangements may be employed for affixing identification data to the container 10. Thus, data may be applied in the form of visual printing, magnetic variations and other forms. The preferred form comprises impressions that may be sensed by microswitch actuators which are moved relative to the surface of the skirt wall 30. These impressions may be formed on the interior or the exterior surface of the wall 30. In FIG. 1 a series of spaced annular ribs 36 are formed on the exterior surface of wall 30 and another series of spaced annular ribs 38 are formed on the interior surface of wall 30. Information may be recorded on these ribs by mechanically or thermally sawing notches which by their placement and spacing are given a preassigned meaning. Several such notches are visible in FIG. 1 where one of them has been designated by the numeral 40. Some means is provided for defining a reference point from which the position of the notches may be determined. In FIG. 1 this means comprises a narrow longitudinal key 42 formed on the exterior surface of wall 20 of container 18. The position of the notch 40, and of other notches representing data, is computed as an angular orientation relative to the position of the key 42. Advantageously, the inner and outer vessels, the skirt, the skirt ribs, the flange and the key are integrally formed to provide a unitary container structure as shown.

A cover 44 is provided for the container to insure cleanliness prior to use and to insure that the blood and serum are not contaminated with dirt and other foreign matter once they are placed in the container. The cover 44 overlies the top of the container and has a central portion 46 on its lower face which is of size to form a pressure fit within the upper rim of the wall 14 of inner vessel 12 so that it serves as a cork. The margin 48 of the cover 44 extends down over the exterior of wall 20 of vessel 18. Advantageously, the cover 44 is formed of an elastimeric material which is self-sealing if punctured. Following extraction of a blood sample from a patient with a syringe, if that method is used, the needle of the syringe is forced through the center portion of the cover 44 and its contents are discharged into the inner vessel 12 without need to remove the cover. When the needle is withdrawn the material of the cover seals the puncture.

These two steps, procuring the specimen and depositing it in one vessel of a double vessel container, comprise the first two steps of the series of steps included in that form of the method taught by the invention which is depicted in FIG. 2 of the drawings. In a step 54, the blood specimen is treated so that the serum of the blood is separated from the remaining constituents of the blood. This may be accomplished by centrifuging or simply by letting the specimen stand undisturbed until separation occurs. Thereafter, in a step 56 a portion of the serum of the specimen is transferred to the other vessel of the double vessel container which contains the specimen. Identification data is applied to the container in a step 58. It is desirable to identify the blood sample with the name of the patient, the intended recipient of test information, the tests to be conducted on the blood, and any diagnostic information that may be useful in the interpretation of blood tests. Examples of such diagnostic information are the age and sex of the person from whom the specimen was taken. Thereafter the data is read in a step 68. In a step 70 a sample of the serum or of the remaining portions of the blood is removed from the container in preparation for testing. In most cases this step will comprise removing a portion of the serum transferred to the other vessel in step 56. In a step 72 the sample is subjected to the requisite tests and in a step 74 the result of the tests conducted in step 72 is correlated with the data read in step 68. If additional tests are to be conducted, the data on the container is again read in a step 76. A sample is removed in a step 78 and is tested in a step 80. Thereafter, in a step 82 the results of the tests conducted in step 80 is correlated with the data read from the container in step 76. Finally, in a step 84 the identification data is correlated with all tests conducted on samples identified by that data. It will be apparent that step 58, "apply data to container," can be accomplished at any time prior to the steps 68 and 76 at which that data is read. Thus, step 58 may precede any or all of steps 56, 54, 52 and even step 50. Similarly, the step 68, "read data," may be accomplished at any time prior to step 74, correlation of that data with the test result. Thus, the step 68 may occur following steps 70 and 72. Similarly, step 76 must precede the correlation step 82 but may succeed steps 78 or 80 or both. FIG. 2 describes the method as it applies to each specimen. The method of the invention is practiced upon more than one specimen, each of which is treated according to the series of steps such as that depicted in FIG. 2 and certain of those steps are practiced with respect to one specimen while others of those steps are being practiced with respect to other specimens. More specifically, the testing steps 72 and 80 may require a different length of time to complete. In most instances, the testing time will exceed the time required to read data, to remove samples and to correlate data and test results. Because of this, the method taught by the invention contemplates performance of certain of the steps of the method within predetermined time periods which are coordinated one with the other. Thus, as part of the method, certain of the steps are conducted so that they are completed before the end of a given unit time period or before the end of an integral number of such unit time periods. This time period is not depicted in FIG. 2 but it is applied to FIG. 2 as follows. If it is assumed that test 72 is conducted so that test data is available prior to the end of three of a given time interval and if it is assumed that the test conducted at step 80 will have been completed and data will be available prior to the end of seven of those same time periods and if it is further assumed that steps 68 and 76 are combined into a single step which is conducted in some time period following initiation of the tests in steps 72 and 80, then the method defined in FIG. 2 would be practiced as follows. Data having been applied to the container in step 58, at some later time in a time period designated period I, step 78 is conducted. In this step a sample of the serum of the specimen is removed and it is subjected to the test. The test begins in time period II and continues through time periods III, IV, V, VI, VII, and VIII prior to the end of which the test will have been completed and test data made available. Advantageously, the data on the container is read not later than the eighth time period. This is the earliest time at which that data and the test results are available within the same time period. For maximum efficiency in practice of the process, the result of the test conducted in step 72 should also be available in this same eighth time period. Since this step takes three time periods to complete, step 70, "remove sample," should be conducted not later than the fifth time period.

To this point, the term "maximum efficiency" has been used to describe the situation in which all of the steps were conducted so correlation would be accomplished at the earliest possible time and if efficiency is so defined steps 58, 68 and 76 may all be combined in a single step and in some cases it may be possible to combine steps 58, 68, 76, 74 and 82 with step 84 so that all data identification and correlation is accomplished in a single step. However, in practice, each specimen may be subjected to from a half dozen to several dozen tests so that some specimens are subjected to more tests than others, some specimens are subjected to tests to which other specimens are not subjected, and some specimens are subjected to tests which are different from the tests to which other specimens are subjected. Thus, in practice, it may be necessary to have available apparatus for conducting one hundred different tests. It is apparent that any attempt to provide sufficient apparatus to realize maximum efficiency in a time sense may result in substantial inefficiency in utilization of that apparatus. This is particularly true since available testing apparatus is universal in the sense that it can be used to conduct many different tests by the introduction of different reagents, by changes in process temperatures, by changes in process sequence and various other modifications. In terms of the diagrammatic presentation in FIG. 2, this means that the series of steps 76 through 82 need not be conducted in parallel or simultaneously with the steps 68 through 74 but that one series of those steps may precede or follow the other series. Obviously, if additional tests are to be conducted they too may be conducted simultaneously with or earlier than or later than the sequence of steps 68–84 and 76–82.

It is implicit in the preceding discussion that the several steps in the method may be separated by storage steps in which specimens are stored in the double vessel container. Any storage prior to application of identification data to the container must be controlled to prevent loss of identity. In addition, in the interval between removal of the sample and correlation of identification data and test result there must be a control to enable proper correlation which involves accomplishment of any storage steps on a timed basis for integral multiples of the unit time period employed in the process.

While the method of the invention may be employed by hand, it is a feature of the invention that it may be practiced automatically. An example of an apparatus by which portions of the method may be practiced automatically is shown schematically in FIG. 3. This apparatus includes means in which a plurality of specimen containers may be moved in sequence to positions in which various steps of the process are practiced within a given time interval. Advantageously, this means includes a carrousel 86 having a number of stations about its outer periphery each of which is adapted to hold a blood specimen container. In FIG. 3 the carrousel 86 rotates upon its central axis to carry twelve containers past the several pieces of apparatus arranged about the carrousel. The carrousel moves counterclockwise in FIG. 3 through an angle comprising one-twelfth of a circle. Movement occurs at the end of unit intervals. At the end of each of a succession of unit intervals each carrousel station is moved to the next working position. In FIG. 3, the container 90 occupies the first working position, at which containers which have traversed past all working stations are removed and new containers are placed upon the carrousel. The container 92 occupies the carrousel station located at the second working position. Data applicator apparatus 94 located at this station applies the identification data to whatever means has been provided on the double vessel container for accommodating such data. When the container 92 has the preferred form shown in FIG. 1, the data applicator unit forms notches, such as notch 40, in the ribs 36 and 38 of the data skirt. The data applicator responds to information applied by the key punch input unit 96. Actuation of keys on the keyboard results in notching the ribs 36 and 38 according to a predefined code which involves the number and spacing of the notches formed. Container 98 occupies the third working position at which a serum transfer unit 100 is located. The serum transfer unit operates to extract serum from the inner vessel 12 of the container 98 and to deposit it in the outer container 18 which surrounds the inner container. The serum transfer mechanism is made self-cleaning whereby to preclude intermingling of the serum from one specimen with another specimen. The container 102 is held in the carrousel station adjacent the fourth working position. No function is performed at this work position in FIG. 3 other than sample storage. Container 106 occupies that station which is adjacent work position five. At this work position a sample extractor 108 removes a predetermined quantity of the serum from the outer vessel of container 106. It submits that sample to a proportioning pump 110 which also receives a reagent from a reagent storage source 112. The proportioning pump 110 supplies the serum sample and reagent in proper proportion to the dialyzer 114 where they are mixed. Diffusible constituents of the sample pass through a membrane of the dialyzer into the reagent line. The combination of reagent and the diffusible constituents of the sample is then heated in a heater 116 and after heating is introduced into a colorimeter 118 where the color of the combination is measured. This color information is made available at one input 120 of a channel selector 122.

Containers 124, 126 and 128 occupy stations of the carrousel adjacent work positions six, seven and eight, respectively. The specimens are simply stored at these stations. Container 130 occupies the carrousel position at work station nine where another sample extractor 132 is located. This sample extractor removes another predetermined quantity of the serum from the outer vessel of the two vessel container 130. Like the sample extractor 108, extractor 132 is self-cleaning. It submits its sample to a proportioning pump 134 which receives another reagent from a storage source 136. The pump submits serum sample and reagent from source 136 to a dialyzer 138 in predetermined proportion. Here diffusible constituents of the serum pass through a membrane into the reagent line and the combination is heated in a heater 140 before being applied to a fluorometer 142 which tests the combination for fluorescence. The output data on fluorescence is made available at an input line 144 to the channel selector 122.

Containers 146 and 148 occupy stations of the carrousel opposite work positions ten and eleven in which the specimen is simply stored. The container 150 occupies that station of the carrousel opposite work station twelve where there is located a data reader unit 152. This unit is capable of rotating the sample container, of identifying the position key 42 and of sensing the presence or absence and the position of notches formed in the ribs 36 and 38 of the container data skirt. In preferred form this sensing is accomplished with microswitches whose actuation or nonactuation as the container is rotated is correlated with the annular orientation of the notches relative to key 42.

The output of the data recorder is applied by line 154 to means by which the identification data read by the data reader unit 152 is correlated with the results of tests conducted upon the samples extracted by sample extractors 108 and 132 from that specimen identified by the identification data. In addition to correlation, this means must preserve the information or at least arrange it in a form for preservation elsewhere. Advantageously, this means comprises a data correlation tape punch unit 156 capable of receiving information from input line 154 and from the channel selector 122 and converting it into holes and lack of holes in a paper tape according to a predefined code. The output information at lines 120 and 144 from the colorimeter 118 and the fluorometer 142, respectively, is analogue in form and must be converted to digital form for use by the data correlation tape punch unit 156. Accordingly, an analogue to digital converter 158 is provided between the output of the channel selector 122 and the tape punch unit 156. The function of the channel selector 122 is to connect output line 10 and output line 144 to the input of the analogue to digital converted 158 one at a time so that first one test result and then the other is applied to the data correlation tape punch unit, and so that no data from either of these tests is applied to the tape punch unit during the interval when the data reader output information is applied to the tape punch unit 156. To insure proper timing of these several functions, a clock 160 is provided. The output of the clock is applied by a line X to the data correlation unit, to the two proportioning pumps, to the channel selector, and to a carrousel drive motor 162. Timing information is also supplied to the data applicator 94, the transfer serum unit 100, the two sample extractors 108 and 132 and to the data reader 152. However, the timing information is supplied to these latter units through carrousel movement by the drive motor 162.

The period of time over which the carrousel holds each specimen container adjacent a work station before indexing it to the next, is the unit process time period which was defined in connection with the description of the process steps diagrammed in FIG. 2. In the example set forth in connection with the description of that process, two tests were to be conducted. One test required seven time periods to complete and the other test required three time units to complete. It was noted that the sample for the first of these tests would be taken not later than the eighth time period prior to test completion time and that the sample for the other test would be taken not later than the fourth time period prior to completion if the test were to be completed at the same time. It was also noted that the step "read data" would need to be completed prior to the end of the last time unit when the test results were also to be available. The apparatus in FIG. 3 is arranged to practice the process of FIG. 2 in just that way. The data reader 152 is located at work station twelve, the sample extractor 132 is located at work station nine and the sample extractor 108 is located at work station five. If the time when a sample is drawn from the outer vessel of the container 106 by extractor 108 is designated at the first time period, then in the second time period the container 106 will have moved to work station six, in the third time period it will have moved to station seven, in the fourth time period it will have moved to station eight. During these second, third and fourth time periods the sample taken by the extractor 108 is being subjected to tests conducted by the testing apparatus comprising proportioning pump 110, dialyzer 114, heater 116 and colorimeter 118. When, in the fifth time period, the container 106 has been moved to work station nine under sample extractor 132, another sample is removed from the outer vessel of the container 106 and is submitted to the second test setup comprising pump 134, dialyzer 138, heater 140 and fluorometer 142. In the sixth and seventh time periods the container 106 occupies work stations ten and eleven, respectively. During these time periods, the samples taken by extractors 108 at work station five and by extractor 132 at work station nine, continue to be processed and tested. Both tests are concluded and test information is available at input line 120 and 144 of channel selector 122 in the eighth time period when the container 106 has been moved to the twelfth work station under the data reader. In this time period, data on the skirt of the container 106 is read and is applied to data correlation tape punch unit 156 and the channel selector 122 passes information from line 120 and 144 through the analogue to digital converter 158 to the data correlation tape punch unit 156 for translation into punched tape form in a position on the tape so that the identification data and the test results can be related one to the other.

It will be apparent that the colorimeter test setup including sampler 108, pump 110, dialyzer 114, heater 116, and colorimeter 118 extracts and processes eight samples in the time period required to extract and complete the test on each sample. The fluorometer test setup extracts and tests four samples in the time required to extract and complete the test on any one sample. The method of the invention, and the apparatus diagrammed in FIG. 3, are capable of correlating the identification data with the test results despite the fact that a number of samples are tested simultaneously and despite the fact that several tests are being conducted simultaneously. It is to be noted, and it is a feature of the invention, that the method imposes no limitation on the time during which tests must be conducted except that the maximum time for conducting tests must be known. Moreover, the tests may be conducted, as evidenced by the apparatus of FIG. 3, according to steps which are controlled by or effected by the time control that relates sample extraction and data reading.

In connection with the description of FIG. 2, it was noted that step 54, "separate serum," step 56 "transfer serum to other vessel," and step 58 "apply data to container" could, but need not be, conducted on a time basis in unison with the steps of sample extraction and data reading. The apparatus of FIG. 3 is arranged so that step 58 "apply data to container" and step 56 "transfer serum" from the inner to the outer vessel, are both conducted in timed sequence in the carrousel setup. It is noted that in the apparatus of FIG. 3 the step 58 precedes the step 56.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. The method of handling blood for analysis utilizing a plurality of double vessel containers comprising the steps of:

placing each specimen of a plurality of source identified blood specimens in one vessel of a respectively associated double vessel container;

applying identifying data to each of said containers;

separating the blood serum from the remainder of the blood constituents in each specimen without removal from said one vessel;

transferring a portion of the blood serum of each specimen from said one vessel to the other vessel of its respectively associated container;

testing the contents of said other vessels for a selected attribute of blood;

correlating and recording information represented by said identifying data with results of tests conducted upon the contents of said containers respectively.

2. The invention defined in claim 1 in which the result of each test is recorded upon conclusion of the test and in which the results of all tests of a specimen are correlated with the identifying data of the container upon conclusion of the last test.

3. The invention defined in claim 1, in which the transfer of serum from said one vessel to said other vessel and the testing of each attribute is accomplished at an individualized and respectively associated physical position and said samples are moved in sequence one at a time to each of said positions.

4. For a blood testing system, a specimen container comprising:

an inner and an outer vessel formed of transparent material on a common axis;

the inner vessel having cylindrical shape open at its upper end and closed at its lower end;

the outer vessel having cylindrical shape and an inner diameter exceeding the outer diameter of said inner vessel, said outer vessel being formed around and at one end of said inner vessel and being open at its upper end and being closed at its lower end which extends no more than mid-way along the length of said inner vessel; and means carried by said container for indicating radial orientation of the container relative to its axis.

5. The invention defined in claim 4, in which said container further comprises means formed on the outer surface of said container at a point above its center of gravity when filled with blood for suspending the container vertically.

6. The invention defined in claim 4, including means carried by said vessel for suspending said container such that it is permitted to swing into a horizontal position about an axis.

7. The invention defined in claim 6, in which the axis about which said container may be swung is closer to the upper end of said container than the center of gravity of said container when filled with a quantity of blood having the volume of said inner container and disposed to fill said outer vessel with the remainder contained in said inner vessel.

8. The invention defined in claim 4, in which means are provided on the outer surface of the inner vessel at a point at least two-thirds of the length of said inner vessel from its upper end for accommodating physical identification data.

9. The invention defined in claim 4, including a cover shaped to overlie both said inner and said outer vessel and having conformation to mate telescopically with the interior of said inner vessel and the exterior of said outer vessel.

10. The invention defined in claim 9, in which said cover comprises an elastimeric material in the region overlying said inner container.

11. The invention defined in claim 10, in which said elastimeric material having characteristics to admit a hollow specimen insertion needle and being renitent in a degree resulting in self-sealing upon withdrawal of said needle.

12. For a blood testing system, a specimen container comprising:

an inner and an outer vessel formed on a common axis;

the inner vessel having cylindrical shape open at its upper end and closed at its lower end;

the outer vessel having cylindrical shape and having an inner diameter exceeding the outer diameter of said inner vessel, said outer vessel being formed around and at one end of said inner vessel and being open at its upper end and closed at its lower end;

means carried by said container by which radial orientation of the container about its axis may be determined;

means for applying identification data to said container;

means for rotating said container sufficiently to effect separation of the serum of any blood disposed within the inner one of said vessels from the remaining constituents of such blood;

means for transferring blood serum from said inner vessel to the outer vessel of said container;

means for reading the identifying data formed on said container;

means for withdrawing samples of serum from said outer vessel and for conducting tests upon said samples; and means responsive to the data applied to said container and to said means for withdrawing samples and conducting tests for correlating information represented by said data with results of said tests.

References Cited

UNITED STATES PATENTS

| 1,874,339 | 8/1932 | Norton | 23—253X |
| 3,081,029 | 3/1963 | Gausloa | 23—259X |
| 3,115,460 | 12/1963 | McCormick | 23—259X |
| 3,190,731 | 6/1965 | Weiskopf | 23—259X |
| 3,266,298 | 8/1966 | Whitehead et al. | 23—253X |
| 3,350,946 | 11/1967 | Isreeli | 73—423 |
| 3,418,080 | 12/1968 | Rochte et al. | 73—423X |
| 3,437,447 | 4/1969 | Harmon | 23—253 |

FOREIGN PATENTS

| 1,206,356 | 8/1959 | France | 23—253 |

JOSEPH SCOVRONEK, Primary Examiner

U.S. Cl. X.R.

23—253, 259, 292; 73—423; 195—139; 215—6; 220—20